US 6,995,874 B1

(12) United States Patent
Cullen et al.

(10) Patent No.: US 6,995,874 B1
(45) Date of Patent: Feb. 7, 2006

(54) SYSTEM FOR ALIGNING DOCUMENT IMAGES WHEN SCANNED IN DUPLEX MODE

(75) Inventors: John F. Cullen, San Francisco, CA (US); Mark Peairs, Menlo Park, CA (US); Jonathan J. Hull, San Carlos, CA (US)

(73) Assignees: Ricoh Company Ltd., Tokyo (JP); Ricoh Corporation, Menlo Park, CA (US)

( * ) Notice: Subject to any disclaimer, the term of this patent is extended or adjusted under 35 U.S.C. 154(b) by 0 days.

(21) Appl. No.: 09/549,967

(22) Filed: Apr. 14, 2000

Related U.S. Application Data

(62) Division of application No. 08/852,489, filed on May 7, 1997, now Pat. No. 6,067,385.

(51) Int. Cl.
*H04N 1/409* (2006.01)
*G06T 5/50* (2006.01)
*G06K 9/68* (2006.01)
*G06K 9/78* (2006.01)

(52) U.S. Cl. .................. 358/3.26; 358/463; 382/218; 382/275

(58) Field of Classification Search .............. 358/3.26, 358/1.12, 1.14, 401, 406, 474, 498, 471, 358/468, 1.9; 382/254, 209, 217, 218, 221, 382/275
See application file for complete search history.

(56) References Cited

U.S. PATENT DOCUMENTS

| | | | |
|---|---|---|---|
| 4,974,034 A | | 11/1990 | Rabb et al. |
| 5,446,524 A | | 8/1995 | Koike et al. |
| 5,532,839 A | * | 7/1996 | Beikirch et al. ............ 358/401 |
| 5,646,744 A | | 7/1997 | Knox |
| 5,832,137 A | | 11/1998 | Knox |
| 5,973,792 A | | 10/1999 | Matsuda |
| 6,061,478 A | * | 5/2000 | Kanoh et al. ............... 382/305 |
| 6,067,385 A | * | 5/2000 | Cullen et al. ............... 382/275 |
| 6,348,980 B1 | * | 2/2002 | Cullen et al. ............... 358/1.9 |

FOREIGN PATENT DOCUMENTS

| | | |
|---|---|---|
| GB | 2288509 A | 10/1995 |
| JP | 6189064 | 7/1994 |
| JP | 11-317858 | 11/1999 |

* cited by examiner

*Primary Examiner*—Scott A. Rogers
(74) *Attorney, Agent, or Firm*—Townsend and Townsend and Crew LLP (57) ABSTRACT

A system and method for handling duplex documents by exploiting bleed-through of the image on the back side of a document. The images of the back sides and front sides of documents are associated with one another to assure correct output in copying, faxing, scanning, etc. This increases reliability, eases recovery from errors including paper jams. Improved document handling capabilities also include avoiding twice duplicated and skipped pages and correcting page orientation errors.

21 Claims, 6 Drawing Sheets

FIG. 5 the consideration
e number of times

'e a p.q.2. For every
1) $B_k$ we have an
up of all the edges

SYSTEM FOR ALIGNING DOCUMENT IMAGES WHEN SCANNED IN DUPLEX MODE

The present application is a divisional of and claims priority from U.S. patent application Ser. No. 08/852,489 filed May 7, 1997 (which issued as U.S. Pat. No. 6,067,385), the entire contents of which are herein incorporated by reference for all purposes.

BACKGROUND OF THE INVENTION

The present invention relates to document image processing and more particularly to duplex document handling.

Duplex copying is an important feature of copier systems operating in businesses. Although, computer storage of document images holds great promise for the future, paper is still the predominant mode of document storage as evidence by rising consumption of paper. A 50% reduction in paper usage is achieved by the use of two-sided documents.

Problems exist however in the handling of two-sided documents in copying and in other office operations such as scanning and faxing. Each page must pass by the scanning system twice, greatly increasing the complexity of the feeder mechanism. Difficulties arise in synchronizing the front page and back page order. When a document containing an odd number of pages are copied onto both front and back sides, often the front page of the document is left as a single sided copy rather than the last page. The same problems may potentially arise in faxing and scanning.

One known solution is described in Japanese Patent No. 7283906 which teaches the use of twin scanner systems including separate CCD sensors so that both the front and the back of a page are scanned in the same pass. This approach requires duplication of not only the CCD sensors but also other scanning hardware and is thus very expensive to implement.

What is needed is an improved economical system and method for handling two-sided documents when copying, scanning, or faxing.

SUMMARY OF THE INVENTION

The present invention provides a system and method for handling duplex documents by exploiting bleed-through of the image on the back side of a document. The images of the back sides and front sides of documents are associated with one another to assure correct output in copying, faxing, scanning, etc. This increases reliability and eases recovery from errors including paper jams. The present invention also provides capabilities of avoiding twice duplicated and skipped pages.

A document handling system according to one embodiment of the present invention initially scans in the front side of a page of a multipage document. To select out the bleed-through portions of the scanned in image corresponding to the back side, the system first identifies the connected components in the scanned-in image as corresponding to the front side content. Removing these connected components obtains an image of the back side, from which the system extracts features. Later when the back side of the image is scanned in directly, the same features are extracted so that the back side may be matched to the front. Document inversion detection may also be applied to detect and correct flipped pages.

In accordance with a first aspect of the present invention, a method for handling a document page includes steps of obtaining first side image data, extracting a set of connected components from the first side image data, erasing pixels representing the set of connected components from the first side image data, and extracting a first set of features from the first side image data as processed by the erasing step, whereby the first set of features represents a bleed-through image of a second side of the document page. This bleed-through image may then be matched with the reverse side to detect possible skipped scans.

Other aspects of the present invention take advantage of modern image processing techniques to increase the quality of either simplex of duplex copying. In accordance with a second aspect of the present invention, a method for copying a multipage document includes the steps of scanning in a plurality of document pages to capture image data for each of the plurality of pages, storing the image data for each of the plurality of pages, and comparing the image data for each of the plurality of pages to identify twice scanned pages. This method may be used to prevent the double copying of pages.

A further understanding of the nature and advantages of the inventions herein may be realized by reference to the remaining portions of the specification and the attached drawings.

DESCRIPTION OF SPECIFIC EMBODIMENTS

The present invention provides an improved document handling system that takes advantage of modern image processing techniques. The improved document handling system of the present invention is implementable in the context of, e.g., common office equipment such as copiers, facsimile machines, scanners, etc. Particular advantages include improved handling of documents with information printed on both sides of the page and the ability to correct for accidental double scanning of a document.

Systems Suitable for Implementation of the Present Invention

Figure 1A:
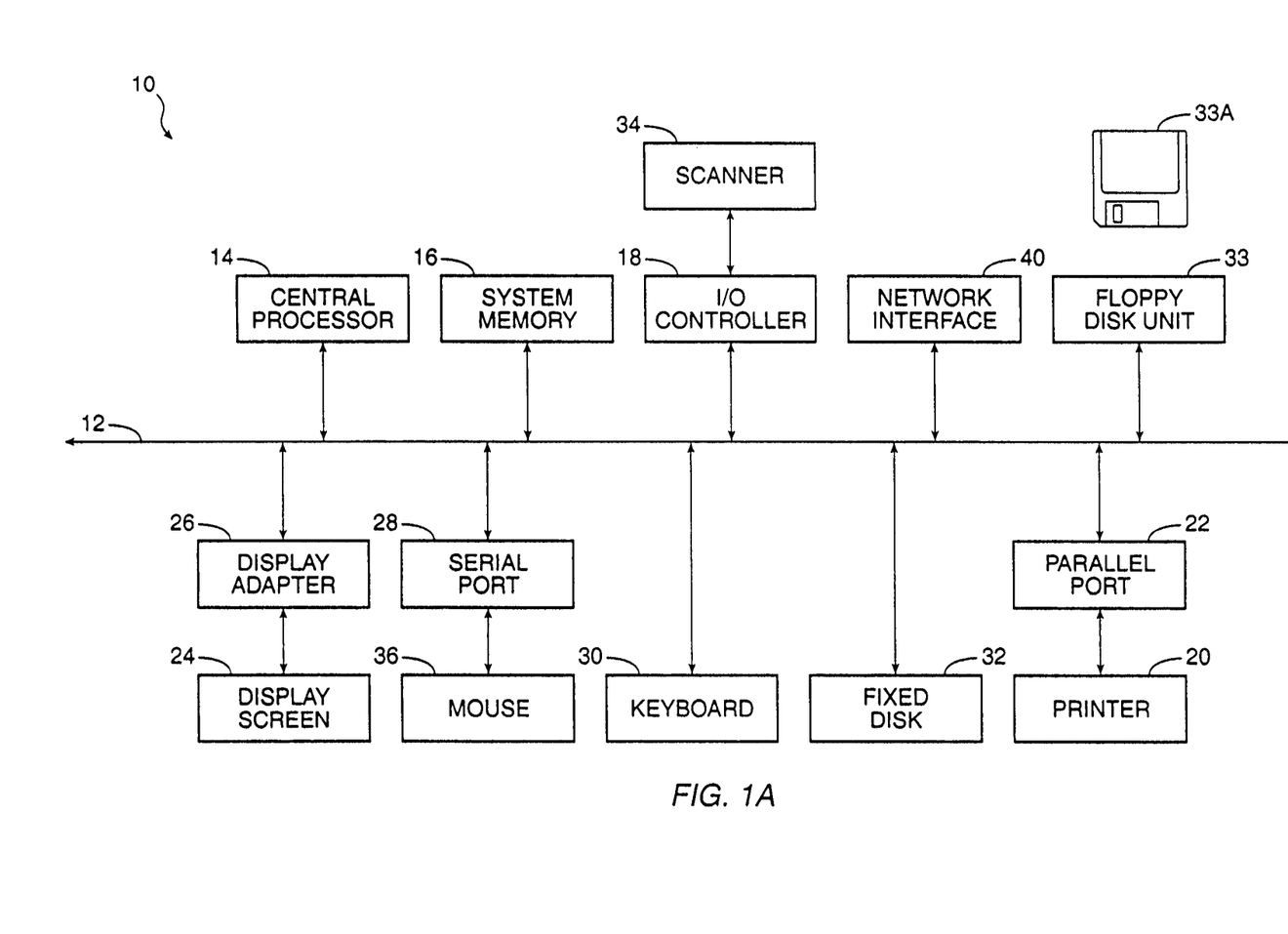
FIG. 1A depicts a computer system for implementing the present invention.

FIG. 1A shows basic subsystems of a computer system 10 suitable for use with the present invention. In FIG. 1A, computer system 10 includes a bus 12 which interconnects major subsystems such as a central processor 14, a system memory 16, an input/output controller 18, an external device such as a printer 20 via a parallel port 22, a display screen 24 via a display adapter 26, a serial port 28, a keyboard 30, a fixed disk drive 32 and a floppy disk drive 33 operative to receive a floppy disk 33A. Many other devices may be connected such as a scanner 34 via I/O controller 18, a mouse 36 connected to serial port 28 or a network interface 40. Many other devices or subsystems (not shown) may be connected in a similar manner. Also, it is not necessary for all of the devices shown in FIG. 1A to be present to practice the present invention, as discussed below. The devices and subsystems may be interconnected in different ways from that shown in FIG. 1A. The operation of a computer system such as that shown in FIG. 1A is readily known in the art and is not discussed in detail in the present application. Source code to implement the present invention may be operably disposed in system memory 16 or stored on storage media such as a fixed disk 32 or a floppy disk 33A. Image information may be stored on fixed disk 32.

Figure 1B:
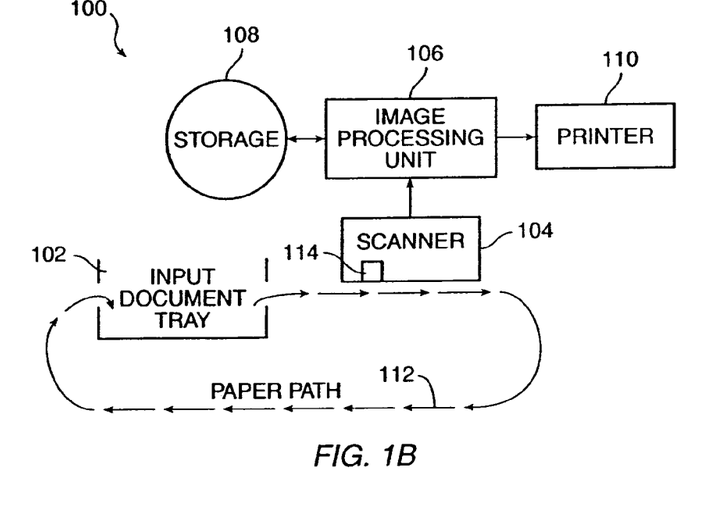
FIG. 1B depicts a copier suitable for implementing the present invention

FIG. 1B depicts, in simplified form, a copier 100 suitable for implementing the present invention. Copier 100 includes an input document tray 102, a scanner 104, an image processing unit 106, storage unit 108, and a printer 110. In operation, a user places a multi-page document into input document tray 102. A paper path 112 exists between input document tray 102 and scanner 104. Sheets individually travel from input document tray 102 through scanner 104 and eventually back into input document tray 102. Within scanner 104, an image processing device 114 captures the image of each document page as it passes through scanner 104. Image sensing device 114 may, for example, be a CCD sensor. Imaging processing unit 106 receives the image data captured by scanner 104. The present invention takes advantage of the ability of image processing unit 106 to store the scanned-in document image data in storage system 108. Image processing unit 106 may not only store the original image data in storage system 108, but may also store extracted features which represent each document image that has been scanned in. After intermediate storage and other processing, duplication is accomplished by printing the image data for each document page via printer 110. Storage system 108 may, for example, be a hard disk drive, a writable optical drive, a magnetic tape drive, or any other storage device.

Figure 1C:
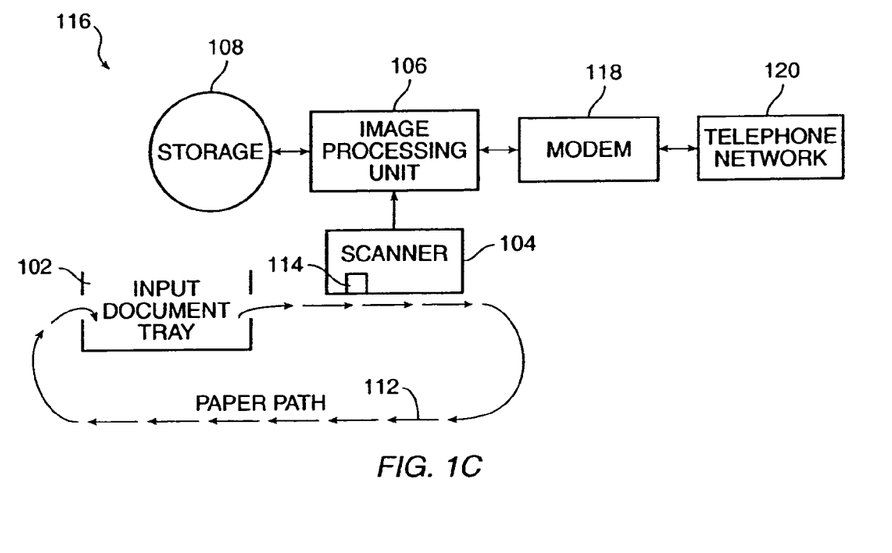
FIG. 1C depicts a fax machine suitable for implementing the present invention.

FIG. 1C depicts a facsimile machine 116 suitable for implementing the present invention. Like copier 100, facsimile machine 116 incorporates input document tray 102, scanner 104, image processing unit 106, and storage system 108. The document to be faxed is placed in the input document tray 102 and a single page at a time passes through a paper path 112 through scanner 104 and back into input document tray 102. However, instead of the document being reproduced as in copier 100, image data representing the document is sent by image processing unit 106 to modem 118 which generates analog or digital signals for transmission via telephone network 120 to a remote location.

Both copier 100 and facsimile machine 116 have been represented in simplified form. For example, many variations in paper path 112 are possible. The paper, after leaving input document tray 102 and passing underneath scanner 104, is passed to a separate output document tray, for example. Image processing unit 106 may be implemented with any combination of digital electronics and software.

Duplex Copying

The present invention facilitates the copying of documents where pages have printed matter on both sides of the page. Duplex copying is accomplished with a simple paper path and with easy recovery from misfed sheets.

Figure 2:
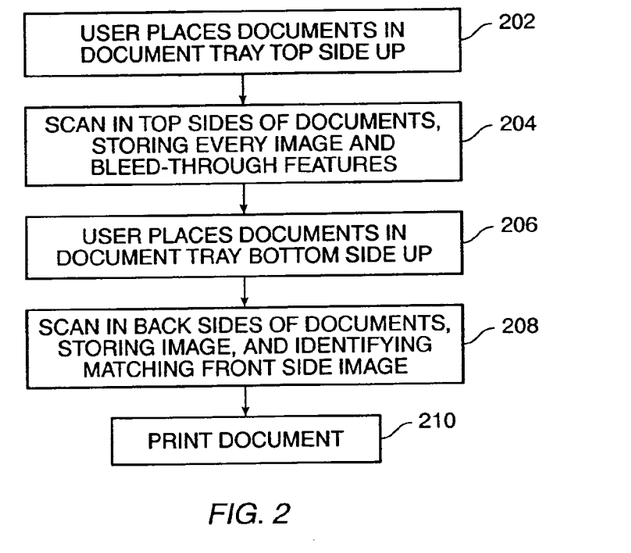
FIG. 2 is a top-level flowchart describing steps of handling duplex documents in accordance with one embodiment of the present invention.

FIG. 2 is a top-level flowchart describing steps of handling duplex documents in accordance with one embodiment of the present invention. At step 202, the user places the document in document tray 102 with the front side of the document facing up.

At step 204, the sheets of the document pass through paper path 112 and through scanner 104 so that images of the top side of the document pages are captured. At the same time, image processing unit 106 stores the scanned-in top side images in storage system 108. Furthermore, image processing unit 106 performs image processing steps shown in greater detail in FIG. 3 to identify features of the reverse side of each document page from the bleed-through observed on the top side. These features are also stored on storage system 108. Once all of the document pages have been scanned and processed in this way, the document is found again in input document tray 102.

At step 206, the user flips the document so that the bottom side of each document page is facing upwards. At step 208, the scanning and processing of document pages is repeated for the back side images. Also, for each back side image scanned in, the matching front side image stored in storage system 108 is identified. In this way, the correct ordering of front side and back side images is determined.

Then at step 210, the document is reproduced and printed on printer 110, the correct ordering of back and front side images having been verified at step 208. The reproduction created at step 210 may be either one-sided or two-sided as desired.

Figure 3:
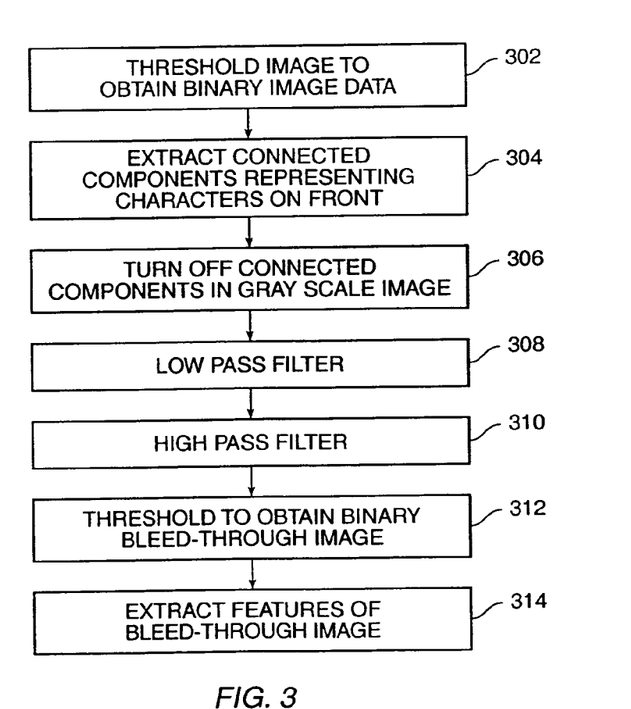
FIG. 3 is a flowchart describing steps of extracting features of a bleed-through image from the scanned-in image of a front side of a document page in accordance with one embodiment of the present invention.

FIG. 3 is a flowchart describing steps of extracting features of a bleed-through image from the scanned-in image of a front side of a document page in accordance with one embodiment of the present invention. The original scanned-in image is generally a gray scale image wherein individual pixels have values indicative of intensity. At step 302, this gray scale image is thresholded to obtain binary image data for the scanned-in image.

At step 304, the preferred embodiment extracts connected components from this binary image data. These connected components represent characters on the front side of the page. A single connected component is a set of contiguous black pixels in an image. The minimum size connected component regarded as a character is a function of the scanning resolution. At step 306, the pixels in the gray scale image corresponding to the connected components are turned off. The image resulting from the processing of step 306 is low pass filtered at step 308 and then high pass filtered at step 310. At step 312, the resulting processed gray scale image is thresholded to obtain a binary image. The binary image obtained at step 312 represents the bleed-through of the image on the reverse side of the document page. At step 314, the preferred embodiment extracts features of this bleed-through image to represent it for matching purposes. The extracted features are stored in storage system 108. In some embodiments, feature extraction and matching are performed on only a portion of the bleed-through image.

In one embodiment, the extracted features are used to calculate work lengths for the document, as described in co-assigned U.S. patent app. Ser. No. 08/523,731, the contents of which are herein incorporated by reference.

In one embodiment, the extracted features are anchor points of characters of the document. The anchor points may be "pass codes" in a line-by-line compressed representation of a document image. A pass code within a compressed representation of a given line indicates that a run of either white or black pixels present substantially above the pass code in a previous line is not found on a current line. CCITT Group III and Group IV facsimile coding standards are examples of compression schemes that make use of pass codes. Accordingly, step 314 may be implemented as a Group III or Group IV type compression followed by the identification of the location of the resulting pass codes. The use of pass codes is described in U.S. patent application Ser. No. 08/695,825, which is co-assigned with the present application. The contents of this application are incorporated by reference for all purposes.

FIG. 3 depicts a technique for obtaining the bleed-through image by use of connected components. However, the present invention contemplates any technique for obtaining a bleed-through image. FIG. 3 represents one example of a technique that can be understood as including a first step of identifying a portion of the front side image due to front side printed matter, and a second step of identifying the bleed-through image to be the front side image pixels not occluded by front side printed matter.

Figure 5:
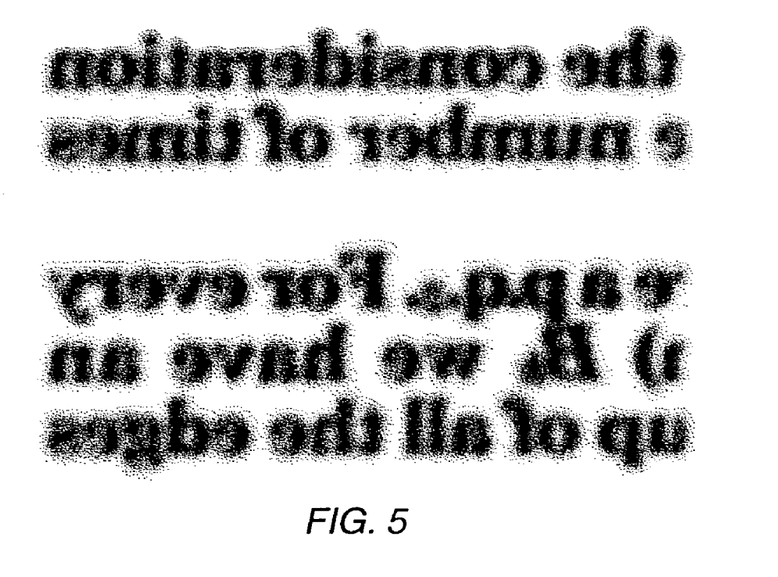
FIG. 5 shows an example of a bleed-through image obtained in accordance with one embodiment of the present invention.
Figure 6:
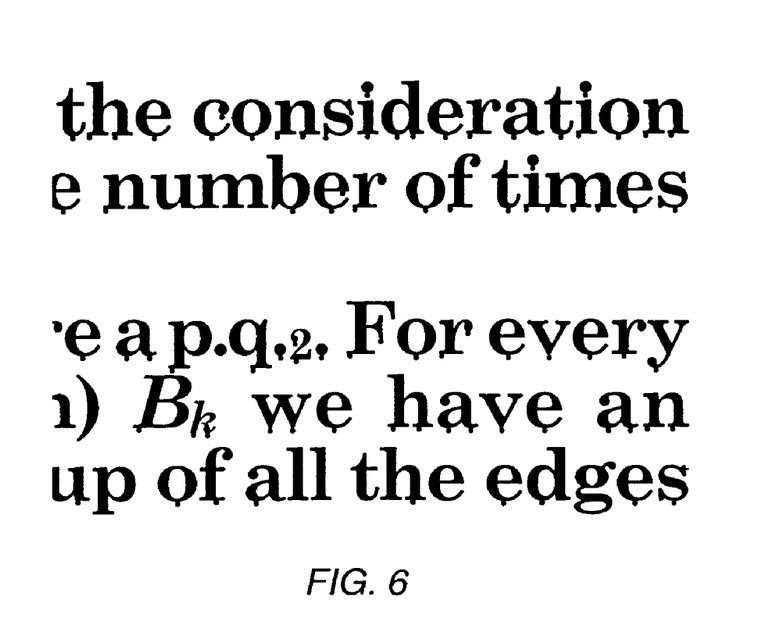
FIG. 6 shows an example of features extracted from a bleed-through image obtained in accordance with one embodiment of the present image.

FIG. 5 shows an example of a bleed-through image as would be obtained in accordance with the present invention at step 312. FIG. 6 shows an example of features extracted from the bleed-through image of FIG. 5 as would be obtained at step 314.

Figure 4:
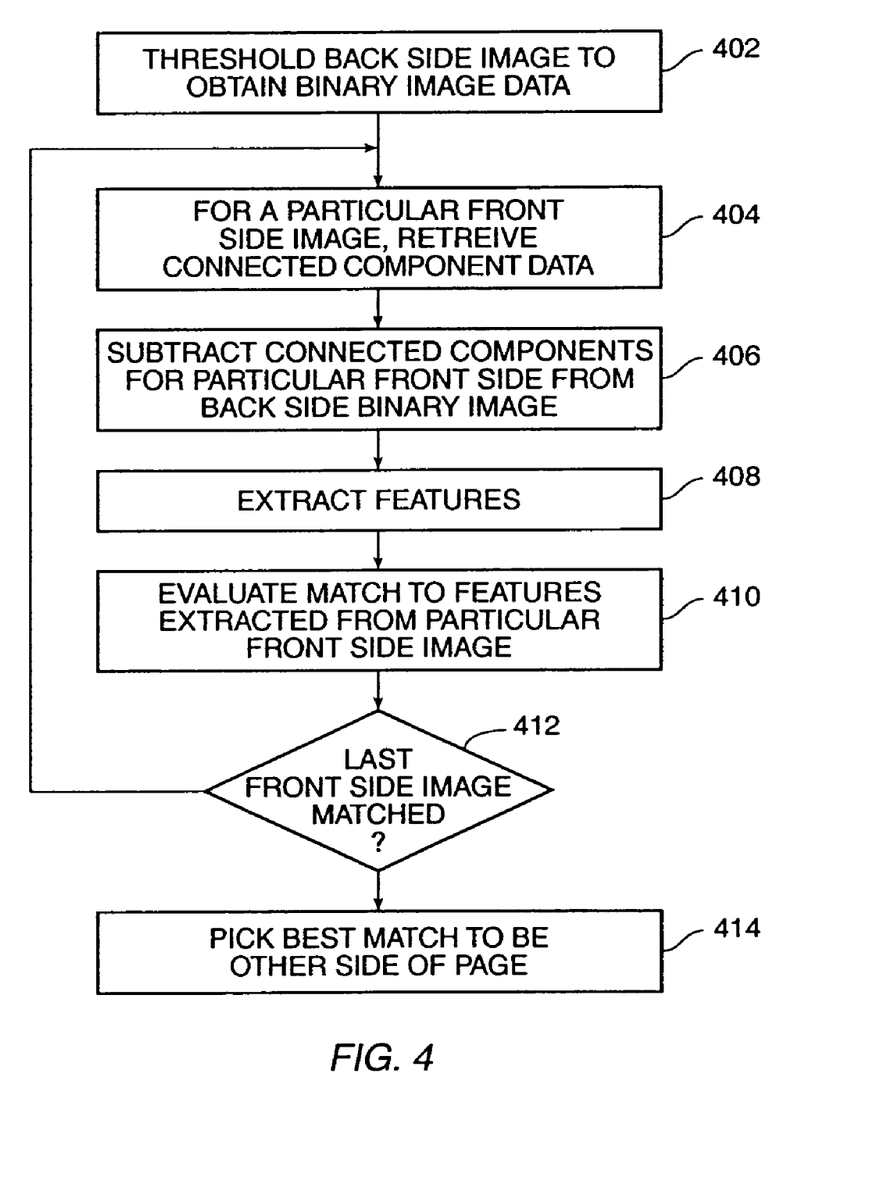
FIG. 4 is a flowchart describing steps of extracting matching features from a back side of a document page in accordance with one embodiment of the present invention.

FIG. 4 is a flowchart describing steps of extracting matching features from a back side of a document page in accordance with one embodiment of the present invention. The steps of FIG. 4 implement the portion of the processing of step 208 for a particular back side image. At step 402, the back side image is thresholded to obtain binary image data. The goal of the remaining steps of FIG. 4 is to identify the front side image scanned in at step 204 which matches this particular back side image. Steps 404–412 are preferably repeated for every front side image that was previously stored in storage system 108. At step 404 the already extracted connected component data for a particular front side image is retrieved. At step 406, the pixels corresponding to the retrieved connected components are turned off in the binary back side image obtained at step 402. At step 408, the back side binary image as has been processed in step 406, has its features extracted in the same way as features were extracted at step 314 of FIG. 3. The images obtained in step 406 corresponds to the image that would have bled through to the other side of the page, and thus, would have been identified at step 312 of FIG. 3. Thus, at step 408, when features are extracted, these features are intended to match the features that were extracted at step 314. At step 410, the features extracted from the back side image of step 408 are compared to the features previously extracted for the particular front side image as step 314. Preferably, the Hausdorff distance metric is used to determine the match between feature sets. The Hausdorff distance metric and a modified Hausdorff distance metric are described in U.S. patent application Ser. No. 08/695,825. The well known Euclidean distance metric may also be used. Step 412 determines if the last front side image has been matched to the back side image. If more front side images remain to be matched to this back side image, processing returns to step 404 for the next front side image. If the last front side image has been matched, processing then flows to step 414. At step 414, the best match as was determined at step 410 is determined to be the front side image which matches this back side image.

If no front side image is determined to match this back side image, it is also possible to check an "upside down" version of each front side image to account for a possible flipped page. If no match is still found, this may indicate a skipped page and a warning message is sent to the user.

Removing Duplicate Scanned Images Due To Misfeeds

Figure 7:
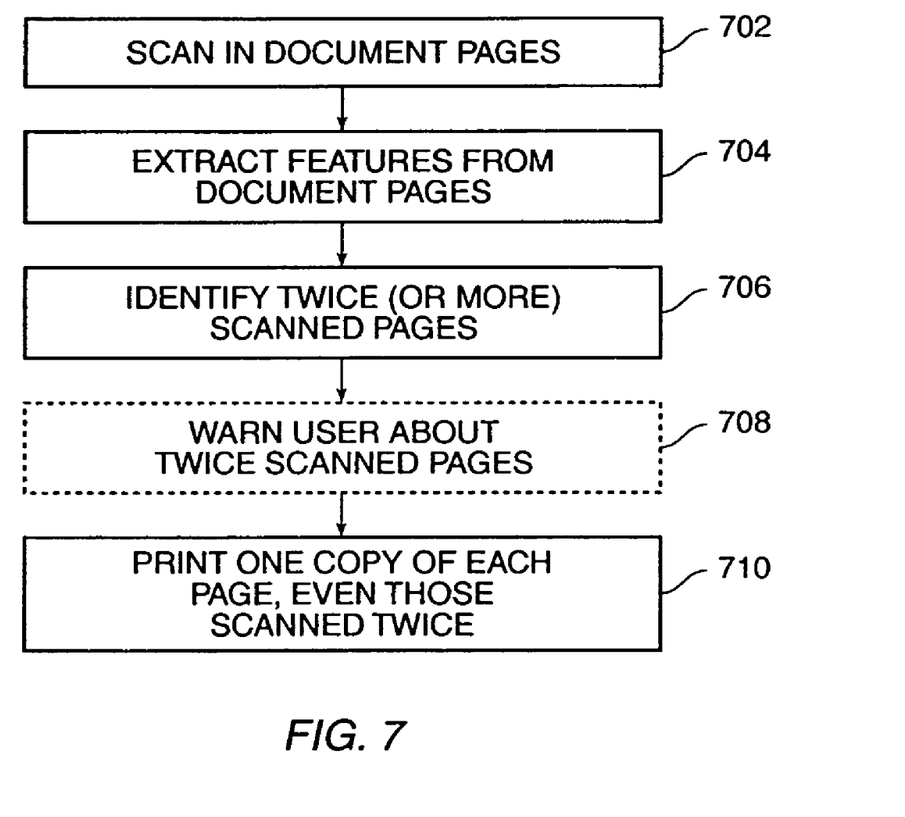
FIG. 7 is a flowchart describing steps of removing duplicate images in accordance with one embodiment of the present invention.

FIG. 7 is a flowchart describing steps of removing duplicate images in accordance with one embodiment of the present invention. This feature finds application in copiers, facsimile machines, scanners, etc. At step 702, all of the pages of a document are scanned in. At step 704, features are extracted from the document images captured in step 702. These features may be Group III or Group IV pass codes as was discussed in reference to step 314. At step 706, each feature set obtained at step 704 is compared to each other feature set to identify pages that have been accidently scanned more than one time. These pages may be identified using the Hausdorff or Euclidean distance metrics as explained above. Optionally, in step 708 the system warns the user the pages have been scanned twice. At step 710, one copy of each page is printed even for those pages which have been determined to have been scanned twice. In the context of a facsimile machine, one copy of each page is sent via the telephone network. Note that this technique may be combined with the duplex copying technique explained with reference to FIGS. 2–6.

The document handling techniques described above may also be enhanced by using scanned image data to verify correct page orientation. A technique for verifying page orientation based on scanned image data is described in U.S. patent application Ser. No. 08/614,913. If incorrect page orientation is identified, the user may be warned or the image may be rotated to its correct orientation automatically.

In the foregoing specification, the invention has been described with reference to specific exemplary embodiments thereof. It will, however, be evident that various modifications and changes may be made thereunto without departing from the broader spirit and scope of the invention as set forth in the appended claims and their full scope of equivalents.

What is claimed is:

1. A method for copying a multi-page document comprising:
   scanning in a plurality of document pages to capture image data for each of the plurality of pages;
   storing the image data for each of the plurality of pages; and
   comparing, using a distance metric, the image data for each of the plurality of pages to identify twice scanned pages, wherein the distance metric is at least one of a Hausdorff distance metric and an Euclidean distance metric.

2. The method of claim 1 further comprising:
   displaying a warning message upon identifying a twice scanned page during the comparison.

3. The method of claim 1 further comprising:
   printing copies of the plurality of pages based on the image data, wherein for each twice scanned page identified in the comparing step, a single copy is printed.

4. A copier comprising:
   a scanner configured to scan a plurality of pages to capture image data for each page of the plurality of pages;

a feature extractor module configured to extract a feature set for each page of the plurality of pages from the image data for the page;

a comparator module configured to perform comparisons, using a distance metric, between the extracted feature sets for the plurality of pages to identify pages from the plurality of pages which have been scanned more than once, wherein the distance metric is at least one of a Hausdorff distance metric and an Euclidean distance metric; and a printing module configured to print the plurality of pages based on the image data for the pages, wherein a single copy is printed for image data corresponding to the pages which have been scanned more than once.

5. The copier of claim 4 wherein the feature set for each page from the plurality of pages comprises CCITT Group IV pass codes.

6. An apparatus for performing a first function on a plurality of pages, the apparatus comprising:

a scanner configured to scan the plurality of pages to capture image data for each page of the plurality of pages;

a feature extractor module configured to extract a feature set for each page of the plurality of pages from the image data for the page;

a comparator module configured to perform comparisons, using a distance metric, between the extracted feature sets for the plurality of pages to identify pages from the plurality of pages which have been scanned more than once, wherein the distance metric is at least one of a Hausdorff distance metric and an Euclidean distance metric; and a function module configured to perform the first function on the plurality of pages based on the image data for the pages, wherein the first function is performed once on image data corresponding to the pages which have been scanned more than once.

7. The apparatus of claim 6 wherein the first function comprises copying the plurality of pages.

8. The apparatus of claim 6 wherein the first function comprises faxing the plurality of pages.

9. The apparatus of claim 6 wherein the first function comprises communicating the plurality of pages via a communication link.

10. A method of performing a first function on a plurality of pages, the method comprising:

scanning the plurality of pages to capture image data for each page of the plurality of pages;

extracting a feature set for each page of the plurality of pages from the image data for the page;

performing comparisons, using a distance metric, between the extracted feature sets for the plurality of pages to identify pages from the plurality of pages which have been scanned more than once, wherein the distance metric is at least one of a Hausdorff distance metric and an Euclidean distance metric; and performing the first function on the plurality of pages based on the image data for the pages, wherein the first function is performed once on image data corresponding to the pages which have been scanned more than once.

11. The method of claim 10 wherein performing the first function comprises printing a single copy of the image data corresponding to the pages which have been scanned more than once.

12. The method of claim 10 wherein performing the first function comprises faxing a single copy of the image data corresponding to the pages which have been scanned more than once.

13. The method of claim 10 wherein performing the first function comprises communicating a single copy of the image data corresponding to the pages which have been scanned more than once.

14. A computer program product stored on a computer-readable medium for performing a first function on a plurality of pages, the computer program product comprising:

code for scanning the plurality of pages to capture image data for each page of the plurality of pages;

code for extracting a feature set for each page of the plurality of pages from the image data for the page;

code for performing comparisons, using a distance metric, between the extracted feature sets for the plurality of pages to identify pages from the plurality of pages which have been scanned more than once, wherein the distance metric is at least one of a Hausdorff distance metric and an Euclidean distance metric; and code for performing the first function on the plurality of pages based on the image data for the pages, wherein the first function is performed once on image data corresponding to the pages which have been scanned more than once.

15. The computer program product of claim 14 wherein the code for performing the first function prints a single copy of the image data corresponding to the pages which have been scanned more than once.

16. The computer program product of claim 14 wherein the code for performing the first function faxes a single copy of the image data corresponding to the pages which have been scanned more than once.

17. The computer program product of claim 14 wherein the code for performing the first function communicates a single copy of the image data corresponding to the pages which have been scanned more than once via a communication link.

18. A computer program product stored on a computer-readable medium for copying a multi-page document, the computer program product comprising:

code for scanning in a plurality of document pages to capture image data for each of the plurality of pages;

code for storing the image data for each of the plurality of pages; and code for comparing, using a distance metric, the image data for each of the plurality of pages to identify twice scanned pages, wherein the distance metric is at least one of a Hausdorff distance metric and an Euclidean distance metric.

19. A copier comprising:

a scanner configured to scan a plurality of pages to capture image data for each page of the plurality of pages;

a feature extractor module configured to extract a feature set for each page of the plurality of pages from the image data for the page, the feature set comprising CCITT Group IV pass codes;

a comparator module configured to perform comparisons between the extracted feature sets for the plurality of pages to identify pages from the plurality of pages which have been scanned more than once; and a printing module configured to print the plurality of pages based on the image data for the pages, wherein a single copy is printed for image data corresponding to the pages which have been scanned more than once.

20. An apparatus for performing a first function on a plurality of pages, the apparatus comprising:
- a scanner configured to scan the plurality of pages to capture image data for each page of the plurality of pages;
- a feature extractor module configured to extract a feature set for each page of the plurality of pages from the image data for the page, the feature set comprising CCITT Group IV pass codes;
- a comparator module configured to perform comparisons between the extracted feature sets for the plurality of pages to identify pages from the plurality of pages which have been scanned more than once; and
- a function module configured to perform the first function on the plurality of pages based on the image data for the pages, wherein the first function is performed once on image data corresponding to the pages which have been scanned more than once.

21. A method of performing a first function on a plurality of pages, the method comprising:
- scanning the plurality of pages to capture image data for each page of the plurality of pages;
- extracting a feature set for each page of the plurality of pages from the image data for the page, the feature set comprising CCITT Group IV pass codes;
- performing comparisons between the extracted feature sets for the plurality of pages to identify pages from the plurality of pages which have been scanned more than once; and
- performing the first function on the plurality of pages based on the image data for the pages, wherein the first function is performed once on image data corresponding to the pages which have been scanned more than once.

* * * * *